(12) United States Patent
Bertash et al.

(10) Patent No.: US 11,659,954 B2
(45) Date of Patent: *May 30, 2023

(54) SYSTEM, APPARATUS, AND METHOD FOR PREPARING A BEVERAGE CARTRIDGE

(71) Applicant: CUPPER LLC, Bradenton, FL (US)

(72) Inventors: Michael Bertash, Bradenton, FL (US); Morgan Bertash, Bradenton, FL (US); James S. Delis, Huntington, NY (US)

(73) Assignee: CUPPER LLC, Bradenton, FL (US)

( * ) Notice: Subject to any disclaimer, the term of this patent is extended or adjusted under 35 U.S.C. 154(b) by 273 days.

This patent is subject to a terminal disclaimer.

(21) Appl. No.: 17/141,839

(22) Filed: Jan. 5, 2021

(65) Prior Publication Data

US 2021/0121000 A1 Apr. 29, 2021

Related U.S. Application Data

(63) Continuation of application No. 15/778,610, filed as application No. PCT/US2016/063702 on Nov. 23, 2016, now Pat. No. 10,925,430.

(Continued)

(51) Int. Cl.
*A47J 31/40* (2006.01)
*B65B 29/02* (2006.01)
*B65D 85/804* (2006.01)

(52) U.S. Cl.
CPC ........... *A47J 31/407* (2013.01); *B65B 29/022* (2017.08); *B65D 85/8046* (2013.01)

(58) Field of Classification Search
CPC ... A47J 31/407; B65B 29/022; B65D 85/8046
See application file for complete search history.

(56) References Cited

U.S. PATENT DOCUMENTS 2,243,895 A * 6/1941 Brown ................ A47J 31/3638
99/289 R
2,860,817 A * 11/1958 Bell ..................... B65G 59/102
221/104

(Continued)

FOREIGN PATENT DOCUMENTS

| AT | 505545 B1 * | 2/2009 | ............... B65B 1/12 |
| WO | WO 2009/080383 A8 | 7/2009 | |
| WO | WO 2015/056240 | 4/2015 | |

OTHER PUBLICATIONS

PCT/US2016/063702, International Search Report and Written Opinion dated Feb. 24, 2017, 13 pages—English.

(Continued)

*Primary Examiner* — Nathaniel C Chukwurah
*Assistant Examiner* — Lucas E. A. Palmer
(74) *Attorney, Agent, or Firm* — Andrew F. Young; Nolte Lackenbach Siegel

(57) ABSTRACT

A system for beverage cartridge preparation allows users to self-select, fill, and seal single use cartridges with improved convenience and for long term storage. The system includes a cartridge handling system and a cartridge filling system operative relative to a cartridge to be filled. The cartridge handling system includes mobility relative to operative members of the cartridge filling system and one or more single use beverage cartridges. Adaptive cartridge shapes and components are provided to fit a particular preparation system. Adaptive and alternative mechanisms for the systems and aspects herein allow convenient manual filling, packing, and sealing of a plurality of single cartridges.

2 Claims, 10 Drawing Sheets

Related U.S. Application Data

(60) Provisional application No. 62/258,561, filed on Nov. 23, 2015.

(56) References Cited

U.S. PATENT DOCUMENTS

| | | | | |
|---|---|---|---|---|
| 2,972,216 | A * | 2/1961 | Schmidt | B65B 7/28 221/188 |
| 3,092,944 | A * | 6/1963 | Wise | A23G 9/283 53/276 |
| 3,179,041 | A * | 4/1965 | Luthi | B65B 39/145 53/529 |
| 3,279,927 | A * | 10/1966 | Reid | B65B 25/06 53/514 |
| 3,293,823 | A * | 12/1966 | Anderson | B65B 7/2842 53/307 |
| 3,357,155 | A * | 12/1967 | Carruthers | B65B 1/24 53/526 |
| 3,501,890 | A * | 3/1970 | Hunt | B65B 1/24 53/529 |
| 3,561,352 | A * | 2/1971 | Hirsch | B30B 9/3082 53/529 |
| 3,579,350 | A * | 5/1971 | Rudd et al. | B65B 9/042 53/529 |
| 3,924,384 | A * | 12/1975 | Kinney | B65B 7/2807 53/485 |
| 3,932,978 | A * | 1/1976 | Kinney | G07F 13/10 221/222 |
| 3,965,656 | A * | 6/1976 | Gerben | B65B 61/28 53/329.4 |
| 3,994,117 | A * | 11/1976 | Kinney | B65B 7/28 141/172 |
| 4,168,599 | A * | 9/1979 | King | B65B 7/2807 53/529 |
| 4,194,341 | A | 3/1980 | Kihnke et al. | |
| 4,285,187 | A * | 8/1981 | Schjeldahl | B65B 43/59 198/748 |
| 4,397,133 | A * | 8/1983 | Hume | B65B 7/2807 53/313 |
| 4,989,753 | A * | 2/1991 | Brogna | G07F 13/10 221/121 |
| 5,001,889 | A | 3/1991 | Mueller | |
| 5,041,297 | A * | 8/1991 | Dowaliby | B65B 1/36 53/529 |
| 5,570,562 | A * | 11/1996 | Anderson | B65B 1/363 53/514 |
| 5,787,687 | A * | 8/1998 | Mueller | B65B 43/58 53/473 |
| 6,053,359 | A | 4/2000 | Goulet et al. | |
| 6,688,460 | B2 * | 2/2004 | Kim | G07F 13/10 141/174 |
| D606,363 | S | 12/2009 | Aardenburg | |
| D653,905 | S | 2/2012 | Bodum | |
| D679,132 | S | 4/2013 | Winberry et al. | |
| 8,584,901 | B2 | 11/2013 | Dooley et al. | |
| 8,602,068 | B2 * | 12/2013 | Williams | B65B 37/20 131/108 |
| 8,635,173 | B2 | 1/2014 | Bartholomew et al. | |
| 9,032,698 | B2 * | 5/2015 | Minnette | B29C 66/344 53/471 |
| D732,390 | S | 6/2015 | Trombetta | |
| 9,169,112 | B2 | 10/2015 | Chase et al. | |
| 9,376,304 | B2 | 6/2016 | Trulaske et al. | |
| 9,414,710 | B2 | 8/2016 | De Graaff et al. | |
| 9,688,465 | B2 | 6/2017 | Trombetta et al. | |
| 10,414,529 | B1 * | 9/2019 | Bayer | B65D 85/8043 |
| 2004/0129145 | A1 * | 7/2004 | Denisart | G07F 9/02 99/275 |
| 2008/0047972 | A1 | 2/2008 | Bartholomew et al. | |
| 2008/0299262 | A1 | 12/2008 | Reati | |
| 2014/0141128 | A1 | 5/2014 | Trombetta et al. | |
| 2014/0352254 | A1 * | 12/2014 | Rea | B65B 29/02 53/167 |
| 2015/0158609 | A1 | 6/2015 | Villain et al. | |
| 2016/0236842 | A1 | 8/2016 | Scrivani et al. | |
| 2017/0096324 | A1 | 4/2017 | Dresser et al. | |

OTHER PUBLICATIONS

U.S. Office Action U.S. Appl. No. 17/141,839 dated Dec. 6, 2022 (9 pages, English).

* cited by examiner

SYSTEM, APPARATUS, AND METHOD FOR PREPARING A BEVERAGE CARTRIDGE

CROSS REFERENCE TO RELATED APPLICATIONS

This application relates to and claims priority as a continuation from U.S. Ser. No. 15/778,610 (allowed) filed May 23, 2018, the entire contents of which are incorporated herein by reference.

U.S. Ser. No. 15/778,610 is a § 317 national phase of Ser. No.: PCT/US2016/063702 filed Nov. 23, 2016 the entire contents of which are incorporated herein by reference, which in turn claims priority from U.S. Prov. Ser. No. 62/258,561 filed Nov. 23, 2015, the entire contents of which are incorporated herein by reference.

FIGURE SELECTED FOR PUBLICATION

FIG. 4A

BACKGROUND OF THE INVENTION

Field of the Invention

The present invention relates to system, apparatus and method for manual preparation of single-serve beverage cartridges. More particularly, the present invention provides a system and apparatus that allows the preparation of single-use brewing cartridges in a convenient counter-suitable construction while sealing cartridges for longer term storage.

Description of the Related Art

Industrial applications of brewing cartridges include the those cartridges provided in the form of pre-made K-Cup® (a trademark of Keurig Green Mountain, Inc., Vermont USA) and Pods® (a trademark of Nescafe) by the for use in industrial and personal-use brewing systems. Recently consumer-based individual use brewing devices have been developed which allow the use of the conventional cartridges in a home-based environment. Typically, the providing company decides upon a particular blend of brewing material (coffee, tea, and beverage) based upon market research. On large scale operations, and with such limited options, it is impossible for an individual consumer or user to select their own individual flavor and taste. Ultimately, the consumer must choose from limited industrial-selected options and is deprived of the ability to self-determine their preferred mix.

The use of individually-fillable multi-use cartridge components also exist, with a type of openable hinged cover. These devices are small to hold and therefore awkward to fill by hand, often creating spills. As a further detriment to such self-filling multi-use cartridges the components are retained, but are not fully sealed from air or moisture degradation between a fill-time and a use-time for the individual. Often the closing-lid will open unintentionally. As a further detriment, exposure of coffee, tea, and other beverage components to humidity, temperature, and the effect of long term storage between uses has a substantial detrimental impact on flavor. Finally, because of their complex-multi-use construction requirements, such multi-use cartridge components are also expensive relative to the marginal component cost of single-use cartridge components. As a result, a consumer desiring a custom blend has only the option of an expensive multi-use cartridge that poorly seals and may open intentionally.

It is also understood that commercially available single-use cartridges such as a K-Cup® and Nescafe Pods® are very expensive on a per-volume basis relative to the commodity cost of the contents. For example, a 64 oz container of common coffee may have a cost of $5.00 at discount, whereas a single-use cartridge (containing approximately 0.30 oz) old commercially may have a unit cost of $1.25-$2.25 each. Similar expense comparisons also exist for other brewing components, e.g., tea, hot chocolate, blends, etc.

Accordingly, there is a need for one of a system, an apparatus, and a method for preparing and fully sealing single-use custom-blendable cartridges that may operate within known consumer systems and overcome at least one of the detriments noted above.

ASPECTS AND SUMMARY OF THE INVENTION

In response, it is now recognized that a beverage cartridge preparation system and method of using the same can allow a consumer to provide a self-selected brewing component that addresses one of the concerns noted herein and provides an improved consumer experience and convenience.

The present invention provides a system for beverage cartridge preparation that allows users to self-select, fill, and seal single use cartridges with improved convenience and for long term storage. The system includes a cartridge handling system and a cartridge filling system operative relative to a cartridge to be filled. The cartridge handling system is mobile relative to operative members of the cartridge filling system. Adaptive mechanisms allows manual filling, packing, and sealing of a plurality of cartridge shapes.

The present invention additionally provides a system or apparatus or method for beverage cartridge preparation that allows mobility relative to step-by-step operative members of the cartridge filling system and one or more single use cartridges to be filled and sealed. Adaptive cartridge shapes and components are provided to fit a particular preparation system. Adaptive and alterative mechanisms for the systems and aspects herein allow convenient manual filling, packing, and sealing of a plurality of single cartridges.

According to one aspect of the present invention, there is provided a manually operated beverage cartridge filling and sealing device.

According to another aspect of the present invention, there is provided a system that contains a single or multiple containers for one or more beverage ingredients (coffee, tea, or other flavored powdered fillers).

According to another aspect of the present invention, there is provided a system wherein each canister has adjustable output to distribute to a target beverage cartridge with a predetermined amount of beverage ingredient filler.

According to another aspect of the present invention, there is provided a system wherein the adjustable output canister gives a user an ability to adjust and select a beverage filler, or mix of fillers or blends, that results in changes in strength and flavors.

According to another aspect of the present invention, there is provided a system wherein the device utilizes one or more of a supply of beverage cartridge containers that are filled by a user with a user-pre-determined amount of a beverage filler.

According to another aspect of the present invention, there is provided a system wherein a filled beverage cartridge is sealed with a cover in a non-limiting manner, which may include but is not limited to thermal sealing, sonic sealing, adhesive sealing, friction sealing, crimp (bending) sealing, and other sealing methods known to those in the sealing technological arts.

According to another aspect of the present invention, there is provided a system wherein alternative cartridge shapes may be filled and sealed, and may as a non-limiting example have a uniquely shaped lower portion of a cartridge side-wall which may be provided to fit only a selected cartridge preparation system.

According to another aspect of the present invention, there is provided a system wherein a portion of a cartridge may be provided that is adaptive to a conventional single cup or pod beverage machine thereby allowing the use of a prepared beverage cartridge with conventional brewing systems and preparation machines.

According to another aspect of the present invention, there is provided a system wherein a resulting prepared sealed beverage cartridge may be provided from a plurality of pre-packaged beverage containers containing beverage ingredients which produce a beverage containing one or more beverage ingredients.

According to an alternative embodiment of the present invention, a system for preparing a beverage cartridge, comprising: a frame member providing a support base spaced from a top support portion; at least one removable sealed container on said top support portion for securely retaining and dispensment of a brewing component during a use into said beverage cartridge; a cartridge handling system on said support base for positioning an empty said beverage cartridge in one of filling position, a packing position, and a sealing position along said support base; a cartridge filling system positioned above said cartridge handling system and relative to said removable sealed container for accessing said brewing component during a filling use; said cartridge handling system further comprising: at least one movement guide apparatus for moving a portion of said cartridge handling system relative to said removable sealed container and returning to a filling position with a selected volume of said brewing component; a filling apparatus for guiding said selected volume of said brewing component from said cartridge handling system into an interior of said beverage cartridge while said beverage cartridge is in said filling position; a motion apparatus containing a pivoting handle mechanism and operative to drive a packing apparatus portion of said cartridge handling system into a filled said beverage cartridge to pack said brewing component while said beverage cartridge is in said packing position; and a sealing apparatus also operative relative to said motion apparatus, and operative to provide a sealing of said beverage cartridge while said beverage cartridge is in said sealing position.

According to another alternative embodiment of the present invention, a system for preparing a beverage cartridge, further comprising: at least one urging spring member in said motion apparatus providing a lifting of said pivoting handle system relative to a pivot point; said pivot point being positioned between said support base and said top support; and at least one connecting member joining said at least one urging spring member to said pivoting handle system thereby enabling said pivoting handle system to pivot about said pivot point and providing a motion of said portion of said cartridge handling system relative to said removable sealed container.

According to another alternative embodiment of the present invention, a system for preparing a beverage cartridge, further comprising: a cover member for sealing said beverage cartridge following said steps of filling and packing; said cover member being one of a foil cover, a friction sealing cover, a plastic cover, a paper cover, an adhesive cover, a crimping cover, and a combination of one or more of said covers; and said sealing apparatus further comprising operative means to seal said cover member to a top portion of said beverage cartridge using at least one of a friction sealing, a thermal sealing, a sonic sealing, an adhesive sealing, and combinations of more than one of these sealing steps.

According to another alternative embodiment of the present invention, a system for preparing a beverage cartridge, further comprising: a mobile cartridge support for supporting said beverage cartridge relative to said filling apparatus, said packing apparatus, and said sealing apparatus; and a movement guide mechanism providing a guided positioning of said mobile cartridge support relative to said filling position, said packing position, and said sealing position along said support base during said use.

According to another alternative embodiment of the present invention, a system for preparing a beverage cartridge, further comprising: a cartridge size guide for adaptively positioning within said mobile cartridge support to adaptively size an opening in said mobile cartridge support to receive and support differently shaped beverage cartridges.

According to another alternative embodiment of the present invention, a system for preparing a beverage cartridge, further comprising: a cartridge packing adjustment member for adaptively adjusting a size of said packer apparatus member to pack said dispensed brewing component within differently shaped beverage cartridges.

According to another alternative embodiment of the present invention, a system for preparing a beverage cartridge, further comprising: a filling adjustable insert for adaptively positioning within said cartridge filling system and for adaptively sizing a received and a dispensed amount of said brewing component from said removable containers to said filling apparatus so as to adapt said system to differently shaped beverage cartridges.

According to another alternative embodiment of the present invention, a kit for preparing a beverage cartridge, comprising: a bounding container for containing a system for preparing a beverage cartridge during one of a transport, a sale, and a storage thereof; a frame member providing a support base spaced from a top support portion; at least one removably sealed container on said top support portion for securely retaining and dispensment of a brewing component during a use into said beverage cartridge; a cartridge handling system on said support base for positioning an empty said beverage cartridge in one of filling position, a packing position, and a sealing position along said support base; a cartridge filling system positioned above said cartridge handling system and relative to said removably sealed container for accessing said brewing component during a filling use of said system for preparing; at least one brewing cartridge; said cartridge handling system further comprising: at least one movement guide apparatus for moving a portion of said cartridge handling system relative to said removable sealed container and returning to a filling position with a selected volume of said brewing component; a filling apparatus for guiding said selected volume of said brewing component from said cartridge handling system into an interior of said beverage cartridge while said beverage cartridge is in said filling position; a motion apparatus containing a pivoting handle mechanism and operative to drive a packing apparatus portion of said cartridge handling system into a filled said beverage cartridge to pack said brewing component while said beverage cartridge is in said packing position; and a sealing apparatus also operative relative to said motion apparatus, and operative to provide a sealing of said beverage cartridge while said beverage cartridge is in said sealing position.

According to another alternative embodiment of the present invention, there is provided a kit for preparing a beverage cartridge, further comprising: a cover member for sealing said beverage cartridge following steps of filling and packing; said cover member being one of a foil cover, a friction sealing cover, a plastic cover, a paper cover, a crimping cover, and a combination of one or more of said covers; and said sealing apparatus further comprising operative means to seal said cover member to a top portion of said beverage cartridge using at least one of a friction sealing, a thermal sealing, a sonic sealing, an adhesive sealing, and combinations of more than one of these sealing steps.

According to another alternative embodiment of the present invention, there is provided a kit for preparing a beverage cartridge, further comprising: a mobile cartridge support for supporting said beverage cartridge relative to said filling apparatus, said packing apparatus, and said sealing apparatus; and a movement guide mechanism providing a guided positioning of said mobile cartridge support relative to said filling position, said packing position, and said sealing position along said support base during said use.

According to another alternative embodiment of the present invention, there is provided a kit for preparing a beverage cartridge, further comprising: a cartridge size guide for adaptively positioning within said mobile cartridge support to adaptively size an opening in said mobile cartridge support to receive and support differently shaped beverage cartridges.

According to another alternative embodiment of the present invention, there is provided a kit for preparing a beverage cartridge, further comprising: a cartridge packing adjustment member for adaptively adjusting a size of said packer apparatus member to pack said dispensed brewing component within differently shaped beverage cartridges.

According to another alternative embodiment of the present invention, there is provided a kit for preparing a beverage cartridge, further comprising: a filling adjustable insert for adaptively positioning within said cartridge filling system and for adaptively sizing a received and a dispensed amount of said brewing component from said removable containers to said filling apparatus so as to adapt said system to differently shaped beverage cartridges.

According to another alternative embodiment of the present invention, there is provided a method for providing a filling of a beverage cartridge, comprising the steps of: providing a frame member providing a support base spaced from a top support portion; providing at least one removably sealed container on said top support portion for securely retaining and dispensment of a brewing component during a use into said beverage cartridge; providing a cartridge handling system on said support base for positioning an empty said beverage cartridge in one of filling position, a packing position, and a sealing position along said support base; providing a cartridge filling system positioned above said cartridge handling system and relative to said removably sealed container for accessing said brewing component during a filling use of said system for preparing; providing at least one brewing cartridge; said cartridge handling system further comprising: at least one movement guide apparatus for moving a portion of said cartridge handling system relative to said removable sealed container and returning to a filling position with a selected volume of said brewing component; a filling apparatus for guiding said selected volume of said brewing component from said cartridge handling system into an interior of said beverage cartridge while said beverage cartridge is in said filling position; a motion apparatus containing a pivoting handle mechanism and operative to drive a packing apparatus portion of said cartridge handling system into a filled said beverage cartridge to pack said brewing component while said beverage cartridge is in said packing position; and a sealing apparatus also operative relative to said motion apparatus, and operative to provide a sealing of said beverage cartridge while said beverage cartridge is in said sealing position.

According to another alternative and non-limiting aspect of the present invention, there is provided a system for preparing a beverage cartridge, comprising: a cartridge handling system and a cartridge filling system, positioned along a common central axis, the cartridge handling system operative to rotationally support a beverage cartridge to be filed relative to the the common central axis, the cartridge filling system further comprising: a fill cavity assembly and a dispensing reservoir, the dispensing reservoir rotationally fixed relative to the central axis on a top side thereof and bounding a volume for containing a material to be dispensed, the dispensing reservoir having a reservoir opening for dispensing the material to be dispensed therethrough during a use, the fill cavity assembly being rotationally operative relative to the common central axis and the dispensing reservoir during a use, the fill cavity assembly including a top plate assembly having a top plate opening proximate the reservoir opening and being adjustably secured to a fill plate assembly defining a fill plate cavity opening cooperating with the top plate opening during the use, means for adjusting a volume of the fill plate cavity relative to the top plate opening including a dam member whereby a volume of the fill plate cavity is adjustable by the dam member extending from the top plate assembly, a bottom plate assembly secured on the common central axis and contacting the fill plate assembly opposite the top plate assembly, and the bottom plate assembly bounding a bottom plate opening available to the fill plate cavity during the use.

According to another alternative and non-limiting aspect of the present invention, there is provided a system for preparing a beverage cartridge, further comprising: a trap door assembly pivotable relative to the central axis and containing a trap door and a trap door dog fixed on a trap door shaft, and the trap door slidably contacting the bottom plate assembly and operatively covering or revealing the bottom plate opening during the use for dispensement of the material to be dispensed into the beverage cartridge.

According to another alternative and non-limiting aspect of the present invention, there is provided a system for preparing a beverage cartridge, further comprising: a beverage cartridge carrier rotationally pivotable relative to the common central axis during the use, the beverage cartridge carrier pivotable between the bottom plate assembly and a support base for the system, and the beverage cartridge carrier further comprising: at least one supporting member supporting the beverage cartridge to be filled.

According to another alternative and non-limiting aspect of the present invention, there is provided a system for preparing a beverage cartridge, further comprising: a beverage cartridge carrier rotationally pivotable relative to the common central axis during the use, the beverage cartridge carrier pivotable at a level between the bottom plate assembly and a support base for the system, and the beverage cartridge carrier further comprising: at least one supporting member supporting the beverage cartridge to be filled.

According to another alternative and non-limiting aspect of the present invention, there is provided a system for preparing a beverage cartridge, further comprising: a lever arm assembly for operating the cartridge handling system and the cartridge filling system relative to the common central axis during the use.

According to another alternative and non-limiting aspect of the present invention, there is provided a system for preparing a beverage cartridge, further comprising: a lid sealing assembly, further comprising: a lid press member extending downwardly away from the bottom plate assembly, toward the base support, above a rotational level of the beverage cartridge and radially distant from the common central axis.

According to another alternative and non-limiting aspect of the present invention, there is provided a system for preparing a beverage cartridge, wherein: the lid sealing assembly, further comprises: a cup lifting assembly extending upwardly from the support base and radially distant from the common central axis.

According to another alternative and non-limiting aspect of the present invention, there is provided a system for preparing a beverage cartridge, wherein: the lever arm assembly rotationally engages the cartridge handling system and cartridge filling system, the lever arm assembly further optionally engages the cup lifting assembly during the use.

According to another alternative and non-limiting aspect of the present invention, there is provided a system for preparing a beverage cartridge, wherein: the beverage cartridge includes a bottom side recess geometry, and the cup lifting assembly protruding geometry shaped for cooperative engagement with the bottom side recess geometry during the use.

According to another alternative and non-limiting aspect of the present invention, there is provided a system for preparing a beverage cartridge, further comprising: a trap door assembly pivotable relative to the central axis and containing a trap door and a trap door dog fixed on a trap door shaft, and the trap door slidably contacting the bottom plate assembly and operatively covering or revealing the bottom plate opening during the use for dispensation of the material to be dispensed into the beverage cartridge.

According to another alternative and non-limiting aspect of the present invention, there is provided a system for preparing a beverage cartridge, wherein: the top plate assembly and the fill plate assembly pivotably mounted to a a first pivot axis member collinear with the common central axis, the trap door assembly operably mounted to a second pivot axis member collinear with the common central axis, and the beverage cartridge carrier rotationally pivotable relative to a third pivot axis member collinear with the common central axis.

According to another alternative and non-limiting aspect of the present invention, there is provided a system for preparing a beverage cartridge, wherein: the lever assembly operatively engages the first pivot axis member in an angular tilting manner relative to a tilting pivot, and the lever assembly operatively engages the second pivot axis member during the use.

According to another alternative and non-limiting aspect of the present invention, there is provided a system for preparing a beverage cartridge, further comprising: an ejection mechanism operative to remove the beverage cartridge from the a beverage cartridge carrier after a filling and during the use, and the ejection mechanism further includes a curved contact for a sliding contact and lifting engagement of the filled beverage cartridge following the use during a rotation of the beverage cartridge carrier.

According to another alternative and non-limiting aspect of the present invention, there is provided a system for preparing a beverage cartridge, wherein: the at least one supporting member includes a beverage cartridge support profile cooperatively shaped to correspond to an exterior profile of the beverage cartridge, whereby the beverage cartridge carrier provides a secure support.

According to another alternative and non-limiting aspect of the present invention, there is provided a system for preparing a beverage cartridge, wherein: the beverage cartridge carrier further comprises at least four supporting members operative to support respectively four beverage cartridges to be filled.

According to another alternative and non-limiting aspect of the present invention, there is provided a system for preparing a beverage cartridge, further comprising: a directional control system on the beverage cartridge carrier, a spring-urged engagement mechanism in the directional control system engaging a non-interfering surface of the beverage cartridge carrier during a use rotation thereof, and engaging respective engagement profiles on the non-interfering surface, whereby the beverage cartridge carrier rotates in only one direction about the comment central axis during the use.

According to another alternative and non-limiting aspect of the present invention, there is provided a system for preparing a beverage cartridge, further comprising: a beverage cartridge carrier secured relative to the common central axis during the use, the beverage cartridge carrier positioned at a level between the bottom plate assembly and a support base for the system, and the beverage cartridge carrier further comprising: at least one supporting member supporting the beverage cartridge to be filled in a releaseably guiding manner.

According to another alternative and non-limiting aspect of the present invention, there is provided a system for preparing a beverage cartridge, wherein: the support base, further comprises a rotating member having a one direction catch mechanism ensuring direction about the common central axis in one direction, and a lower common level and an upper level on the support base, the upper level being radially arrayed relative to the common central axis, and a sloped transition between the lower common level to the upper level sufficient to guide a beverage cartridge to be sealed during the use, whereby during the use, a rotation of the support base urges relative to the supporting member drives a respective the beverage cartridge from the lower common level to the upper level.

According to another alternative and non-limiting aspect of the present invention, there is provided a system for preparing a beverage cartridge: further comprising: a lid sealing assembly, further comprising: a lid press member extending downwardly away from the bottom plate assembly, toward the base support, above a level of the beverage cartridge and radially distant from the common central axis, and the lid press member positioned to receive an external lid for sealing and to urge the lid onto the beverage cartridge as the beverage cartridge is urged onto the upper level of the base plate.

The above and other alternative and adaptive aspects, features and advantages of the present invention will become apparent from the following description read in conjunction with the accompanying drawings, in which like reference numerals designate the same elements.

BRIEF DESCRIPTION OF THE DRAWINGS

FIG. 10B, continues from FIG. 10A, wherein FIG. 10B is an exemplary schematic layout of selected elements and positions in axial alignment in the proposed invention performing a cup- or cartridge-filling process. It will be understood that selected steps on each column occur relative to the relative position of the lever to the respective axes of rotation.

DETAILED DESCRIPTION OF THE PREFERRED EMBODIMENTS

Figure 1:
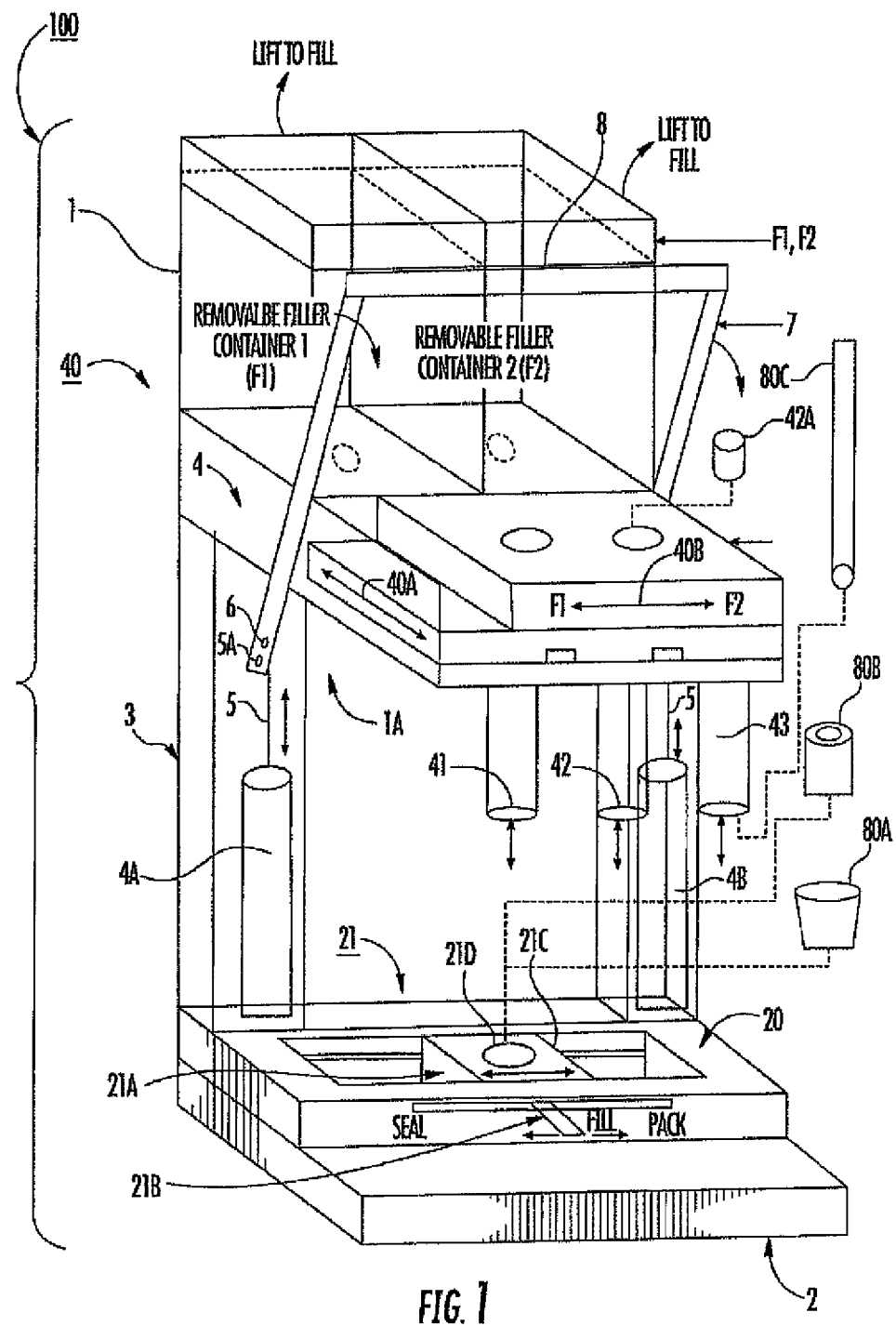
FIG. 1 is a perspective front illustration of an alternative system for preparing a beverage cartridge provided in a bounded kit arrangement with one or more cartridges, guides and components.

Reference will now be made in detail to embodiments of the invention. Wherever possible, same or similar reference numerals are used in the drawings and the description to refer to the same or like parts or steps. The drawings are in simplified form and are not to precise scale. The word 'couple' and similar terms do not necessarily denote direct and immediate connections, but also include connections through intermediate elements or devices. For purposes of convenience and clarity only, directional (up/down, etc.) or motional (forward/back, etc.) terms may be used with respect to the drawings. These and similar directional terms should not be construed to limit the scope in any manner. It will also be understood that other embodiments may be utilized without departing from the scope of the present invention, and that the detailed description is not to be taken in a limiting sense, and that elements may be differently positioned, or otherwise noted as in the appended claims without requirements of the written description being required thereto.

Various operations may be described as multiple discrete operations in turn, in a manner that may be helpful in understanding embodiments of the present invention; however, the order of description should not be construed to imply that these operations are order dependent.

FIG. 1 provides a system and apparatus 100 for preparing a beverage cartridge 80A which may be any type of conventional empty cartridge or an innovative or custom type of cartridge or cup shape or cup form without limitation thereto. A frame 1 for system 100 includes a base 2 and a back support member 3 projecting upward therefrom relative to a support surface and to provide a top support 4 for supporting one or more respective removable filler and dispenser containers F1, F2.

It will be understood that respective removable filler and dispenser containers F1, F2 are not limited in number (more than one is permitted) and they may be removable from or secured to frame 1 and top support 4. Additionally, each may be of any convenient and adaptive shape without limitation so as to improve nesting on frame 1 and preferably an air-tight seal therewithin. Similarly, upon nesting with top support 4, containers F1, F2 may sealing secure therewith so as to dispense upon an operation of a pivoting handle 7 with a grip member 8 during a use and then return to a sealed-condition between dispensements of the contents.

Frame 1 and back support 3 further provides two opposed dampening sprigs 4A, 4B secured on base 2 and positioned in a pivoting arrangement with an extended bar member (shown) of handle 7 relative to respective side pivot points 6 (left-side shown), 6 (right-side not shown) on either side of system 100 as shown. Connecting rods 5A (left-side shown), 5B (right-side not shown), respectively join dampened spring member 4A, 4B to portions of the bar members extending from handle 7 between respective pivot points 6, 6 forming, preferably, a second order lever so as to increase a mechanical pressing advantage. It will be understood by those of skill in the art that alternative lever-movement-pressing mechanisms may be provided without departing from the scope and spirit of the present invention such that the related components may be understood to function as a pressing system, as will be discussed.

Containers F1, F2, etc. rest on top support 4 and dispense therebelow to a cartridge filling system 40 operative to dispense a desired content to a selected cartridge member.

On base 2, a cartridge preparation stage 20 is provided supporting a cartridge handling system 21 having three designated stations, fill, pack, and seal (as shown) and a mobile support carrier 21A that may be slidably positioned along relative stations (shown in the 'fill' station). A lever member 21A is operatively communicating with an internal movement guide means 21C and joined with mobile support carrier 21A to allow a convenient user movement by actuation of lever member 21A between stages.

It will be understood that an opening 21D in mobile support carrier 21A may be shaped to support and accommodate any conventional or alternative cartridge or cup to be filled. While not required, to assist in this process an exemplary cartridge adaptor 80B is shown that may fit within opening 21D to receive and support smaller or alternatively shaped cartridges during a filling-packing-sealing process. Alternatively the proposed system 100, in a kit form, may further include alternative mobile supports 21A that may be swapped-out depending upon a desired final-use-cartridge shape or geometry. In this manner, the present system 100 may be readily adapted to all conventionally-known cartridge geometries, and may also be readily adapted to alterative cartridge geometries (for example, an alternatively shaped cartridge bottom geometry).

Operatively connected to the press system and operative relative to an up-down position of handle 7 are a filler apparatus 42 for flowing contents into a cartridge, a packer apparatus 43 for pressing and packing contents into a cartridge in a pack. As was noted above, to allow ready adaptation to alternative cartridge geometries, an exemplary cartridge-adaptor member 80C is shown. As shown, cartridge-adaptor member 80C is shaped with a smaller-sized geometry for use with ones of sealer, filler, packer apparati 41, 42, 43, and in a preferred form may replace packer apparatus 43 for readily packing the dispensed contents into a small-sized cartridge (for example, a Nescafe® pod) supported by an adaptor 80B as a guide within mobile support 21A in cartridge handling system 21. In such exemplary use, the cartridge-adaptor member 80C is positioned within, or fully replaces, packer apparatus 43. A similar substation for alternative-adaptor members 80C, not shown, may allow system 100 to be adapted to accommodate all conventionally known cartridges as well as custom supplied members.

Cartridge filling system 40 will be understood, in this alternative embodiment to have one or more traveling sliders to aid in a sealed dispensment of a filler material from respective containers F1, F2, etc. These traveling sliders are shown as traveler components 40A (for a side-side motion as shown to enable a designation between one or more removable containers), and 40B (for an inward-outward motion as shown to enable a pick-up of material to-be-dispensed from the removable containers and a transport to a position proximate the filler apparatus 42 so as to slide down into a cartridge 80A secured within opening 21D in mobile support 21A). While any guiding means may be employed to ensure the guided travel of traveling components 40A, 40B, illustrated (but not numbered) are several guiding key-ways relative to top support 4, back support 3, and frame 1 to allow a forward-outward motion for retrieving contents from containers F1, F2, etc., and for positioning the contents relative to filler apparatus 42 to downward dispensment into an empty cartridge for filling. This is accomplished in a convenient manner so that no contents are spilled, and so that the dispensing occurs downward when filler apparatus is closely proximate the opening of a cartridge-to-be-filled. This is accomplished upon one triggered motion f handle 7.

Next, mobile support 21A is repositioned from the 'fill' location to the 'pack' location via the movement guide means 21C and lever member 21B, relative to packer apparatus 43, and when positioned lever 7 is actuated again, urging packer apparatus 43 toward opening 21D and pressing the contents suitably within the cartridge. Then, next, mobile support 21A is repositioned from the 'pack' location via the movement guide means 21C and lever 21B along to the 'seal' station proximate to the sealer apparatus 41 positioned o the cartridge filling system 40. Thereupon, on motion of handle 7, a sealing cover (not shown, but of any form) is positioned on an upper rim of the filled-packed cartridge and a sealing occurs.

It will be understood that the sealing may occur in any form suitable for fully sealing the contents in the cartridge. As a non-limiting example, sealer apparatus 41 may include a thermal sealing feature, and a user may positioned a pre-supplied sealing cover (paper, foil, plastic etc.) there with, so that upon operation of lever 7, the sealing cover is sealingly secured to cartridge forming a unitary beverage cartridge whole for storage or later use. Alternatively, sealer apparatus may be provided with a pre-supplied crimp cover, so that upon operation of lever 7, the sealer apparatus 41 provides a crimping action. Similar arrangements can be provided by those of skill in the art for adhesive sealing, friction-sealing, or any other conventional sealing technology without departing from the scope and spirit of the present invention.

Figure 2A:
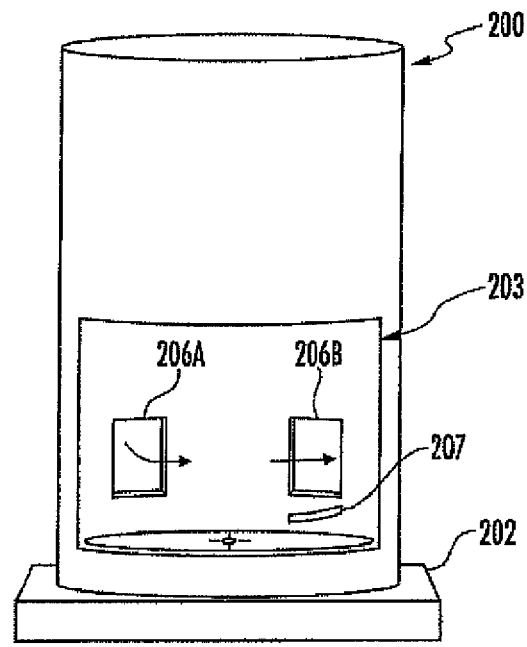
FIG. 2A is an exemplary front view of an outer housing of the proposed invention having a general contour about a center pivot axis indicator.
Figure 2B:
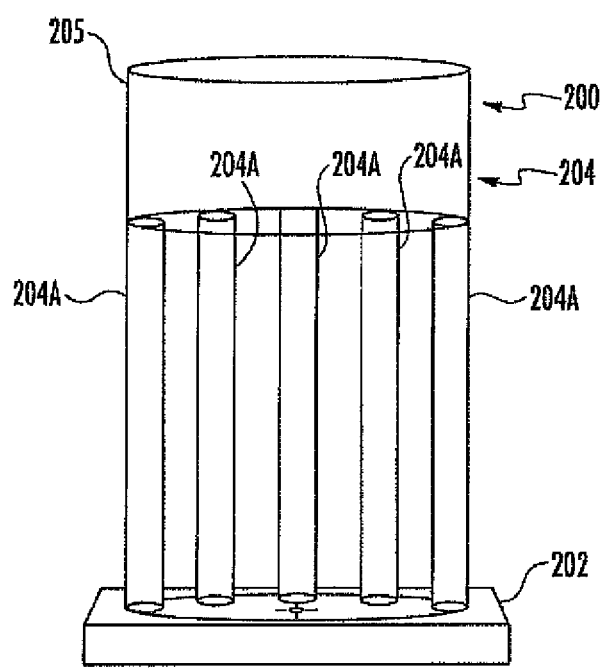
FIG. 2B is an exemplary inner support illustration of the housing of the proposed invention noting general support column and container location relative to a center pivot axis indicator.

Additionally referring now to FIGS. 2A and 2B where an exemplary front view (FIG. 2A) of a housing 200 of the proposed invention having a base member 202, a generally bounding outer shell 201 for containing the inner components (to be discussed) and for allowing access to the components via access portals generally arranged thereon (discussed but only generally shown as non-limiting examples 206A, 206B). It will be understood that depending upon the arrangement and operation of the present invention, housing 200 may have differently shaped, and different numbers of, or no, access portals 206A, 206B and may rely only on a general initial opening 203 provides access to the internal components as will be discussed. An illustrated central pivot axis indicator of a pivoting stage (discussed later) is provided for illustrated purposes but will be understood as illustrative only.

Additionally provided in housing 200 is a positioned ejection mechanism 207, shown in this embodiment as projecting inwardly from an interior wall of opening 203 so as to contact a cartridge cup 301 (discussed below) and to eject cup 301 from the housing 200, in this embodiment via opening portal 206B. Ejection mechanism 207 is shown here (FIG. 2A, and later in relative axial position in FIG. 4A) as a shaped guiding arm member that contacts cup 301 during rotation of the cup carrier (discussed below) so as to lift a sealed-cup 301 from the opening of the cup carrier sufficient to clear the cup rim edges, and to guide the cup 301 away from the cup carrier outwardly from the rotation axis and out of the system for later storage. It will be understood, that while ejection mechanism 207 is illustrated here as a curved guiding and lifting arm having an arc shape, that there is no limitation thereto, and that ejection mechanism 207 may contain multiple parts or features that engage a filled-and-sealed cup 301 for removal from the cup carrier and ejection thereby.

In FIG. 2B an exemplary inner support system 204, having one or more support members 204A, extending from base member 202 and generally supporting a storage area 205 for storage of a beverage material and other items as will be discussed. It will be understood, that the inner support system 204, members 204A, and storage area 205 are also arranged relative to the central pivot axis indicator as shown for the operation of the to-be-discussed components. One of skill in the art, having considered FIGS. 2A, 2B will understand that the general arrangement and support system is reflective of the overall invention, but is adapted for use with a rotating cartridge (cup) handing system and filling system (to be discussed below) thereby allowing access to a general central region, with exterior axis-portals (and exit portals) (all not shown) to allow the input of an empty cartridge-to-be-filled, a sealing lid, movement of the cartridge for filling and sealing, and ejection of the filled-and-sealed cartridge following a filling operation (all as to be discussed). It will also be understood, that alternative shapes, sizes, and structures may be provided having a difference in appearance (e.g., square, rectangular, circular, ovoidal, pyramidal, etc.) without departing from the scope and spirit of the present invention.

Figure 3A:
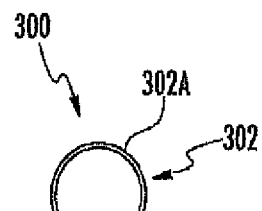
FIG. 3A is a top view of a lid member formed of a generally laminar material.
Figure 3B:
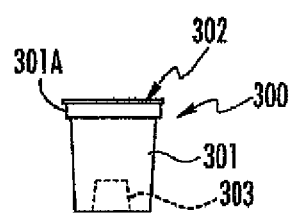
FIG. 3B is a side view of an exemplary adaptive cup or cartridge assembly of the proposed invention in combination with the lid.
Figure 3C:
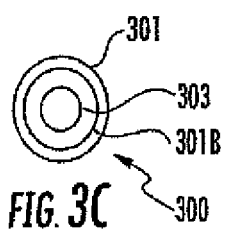
FIG. 3C is a bottom view of the exemplary adaptive cup or cartridge as shown in FIG. 3B.

Additionally referring now to FIGS. 3A, 3B, and 3C wherein a beverage cup or beverage cartridge system 300 is provided with a cup member 301 having a shape suitable for use a flat lip 301A, a sealing lid member 302 shown here as generally round and flat and having an adhesive portion 302A adjacent the outer rim thereof for sealing with a top surface of flat lip 301A of cup member 301. In one embodiment (FIG. 3C) a bottom 301B of cup member 301 is provided with a recess geometry 303 as shown. In FIG. 3B the exemplary geometry 303 is a generally cylindraceous form having tapered walls. It will be understood that recess geometry 303 may have any shape without limitation, and is provided as an aid for lifting and sealing cup member 301 to lid member 302 in a reliable manner, and one which may be customized upon a manufacturer's intention to prevent the use of non-authorized cartridge or cup systems 300 in the present invention.

While not limited hereto, one exemplary cup or cartridge may have a volume of approximately 2.0 cubic inches (30 milliliters), a height of approximately 2.0 inches, and may contain different powder filters, support shapes, sealing features, etc., as know to those of skill in the art, and without limitations.

Referring now to FIGS. 4A and 4B to FIG. 8B a perspective illustrative layout is provided for array of selected elements (not all) and arrangements of the present inventive handling and filling system 400. As will be understood from the discussion below, the general arrangement components will be understood as providing three collinear axes of rotation or movement about a common center line (CL) relative to a bottom support base 480.

There is a first centermost column axis 401 connecting a lever arm 450 and a fill cavity assembly 460 (to be discussed) including a top plate assembly 420, a fill plate assembly 430, and a bottom plate assembly 440. Lever arm 450 is pinned to centermost column 401 by a pin 401A, with the ability to rotate in the vertical dimension. The fill cavity assembly 460 is also pinned to centermost column 401 (by a pin, not shown, interior to fill plate assembly or otherwise), and rotates with centermost column axis 401. This rotation is constrained with stops (not shown) or with boundaries of opening 203, to approximately 90 degrees (90°). A catch mechanism (not shown) is alternatively provided to constrict movement to trace either leftwardly or rightwardly motion (clockwise or counterclockwise) upon a desire of the manufacturer.

There are two opposed pivot guides 401B, 401B engaging the respective columns axes herein and pivotably guide by supporting on support base 480 and the main centerline (shown here noting on a beverage holder 490 for storing a powdered material (e.g., coffee, tea, flavorings etc. in a powdered or granular form for dispensment) and dispensing through an opening 491 via a gravity feed-process. For example, when top plate assembly 420 having an opening 421, is aligned with opening 491 of beverage holder 490, grains of the powdered beverage fall through, as will be discussed.

A second central concentric column or axis 501 is free of centermost axis 401 and includes an open slot 501A, 501A on either side thereof via which lever arm 450 extends therethrough to actuate centermost axis 401, and which is pined by pin 401A. In this manner, it will be also understood that lever arm 450 extends in a sliding manner (while pinned) through each column including center column 401, for later triggering of a sealing assembly, as will be discussed. In other words, it will be understood that lever arm 450 includes a sliding slot 451 riding on pin 401A, allowing lever arm 450 to slide through the center axis in a direction I/O (in out), while also pivoting upwardly/downwardly (U/D) as seen in FIGS. 4A, 4B, 8A, 8B, and in a rotational manner (see Row G in FIGS. 10A, 10B).

It will be understood that concentric column or axis 501 generally surrounds centermost axis 401, and pivots fully independently thereof, but also includes openings for operational needs, as will be discussed. It will be further understood that concentric column axis 501 also rides on extended wing portions (shown in FIG. 4A) of pivot guides 401B, 401B for pivoting about the common axis.

Second central concentric column 501 operates a fill trap door assembly 510 relative to bottom plate assembly 440. Fill trap door assembly 510 includes a trap door 511 plate that rides against (slides to sealingly close or open) the opening 441 in bottom plate 440, above cup carrier (to be discussed) and rotates with the trap door assembly 510. A trap door shaft 512 rigidly connects trap door 511 with a trap door dog member 513 (dog 513). Trap door 511 and dog 513 project outwardly away from trap door shaft 512 in a common direction. An opening in second central concentric column shaft 501 allows dog 513 to extend therefrom outwardly, and into a movement path of the cup carrier (to be discussed) and individual cups or cartridges 301 (to be discussed). Dog 513 is connected axially immediately below the cup carrier (to be discussed) for interference with cups or cartridges 300 during operation. Dog 513 extends from an opening or fixing point 501B in second central concentric column 501 to allow engagement and triggering with a passage of a cup 301, as will be discussed.

The third concentric column or axis arrangement 601 rotatingly supports the cup carrier 600 and operates either as an independent collar 602 or as supports 602 or a support ring 602, extending outwardly from $2^{nd}$ concentric column 501, thereby allowing a central securing portion 603 of cup carrier 600 to rotate freely relative to and independently of first centermost support axis 401 and second central concentric column 501.

Figure 4A:
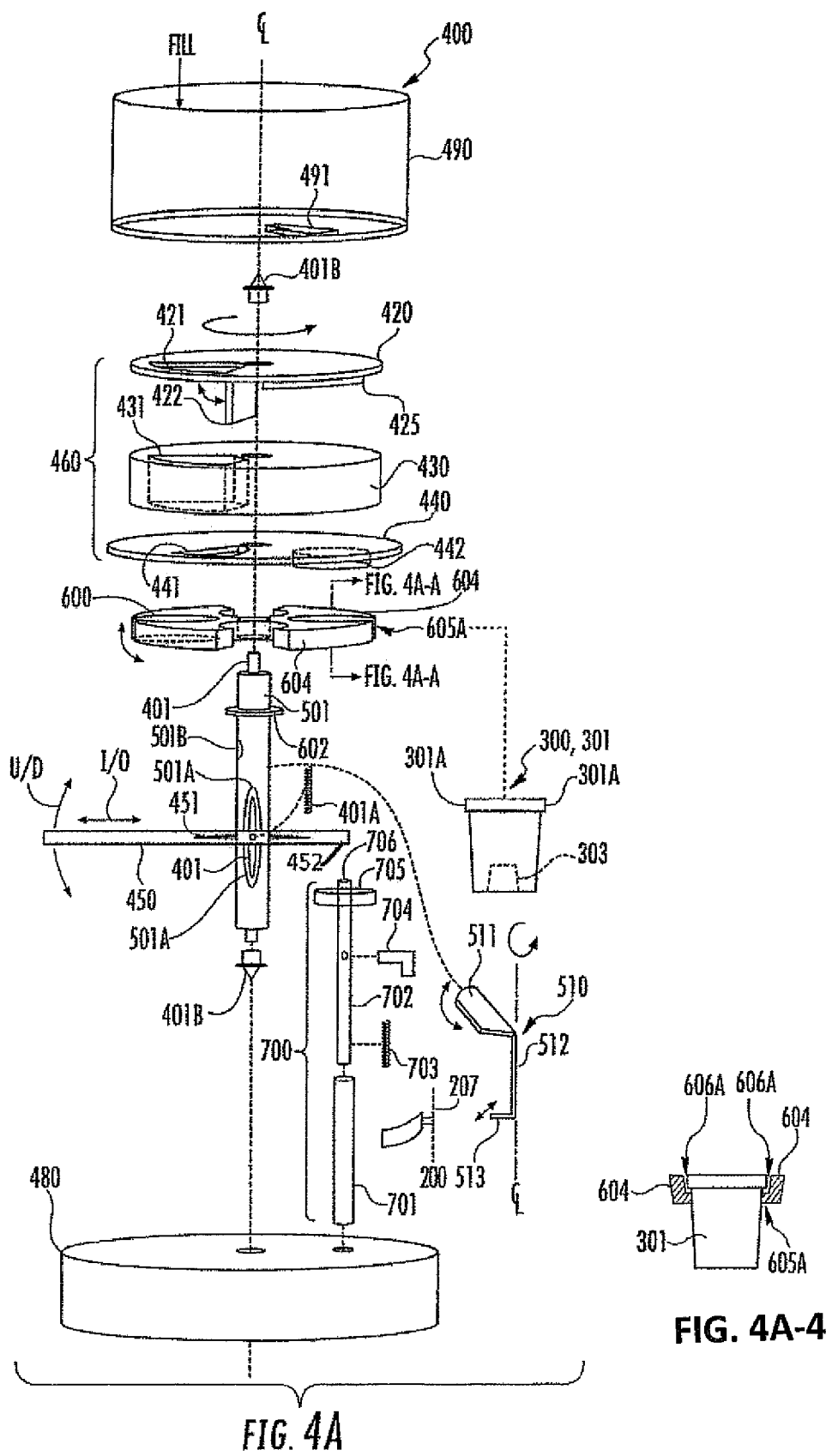
FIG. 4A is a partial exploded view of selected internal components of the proposed invention in wide array.
Figure 4B:
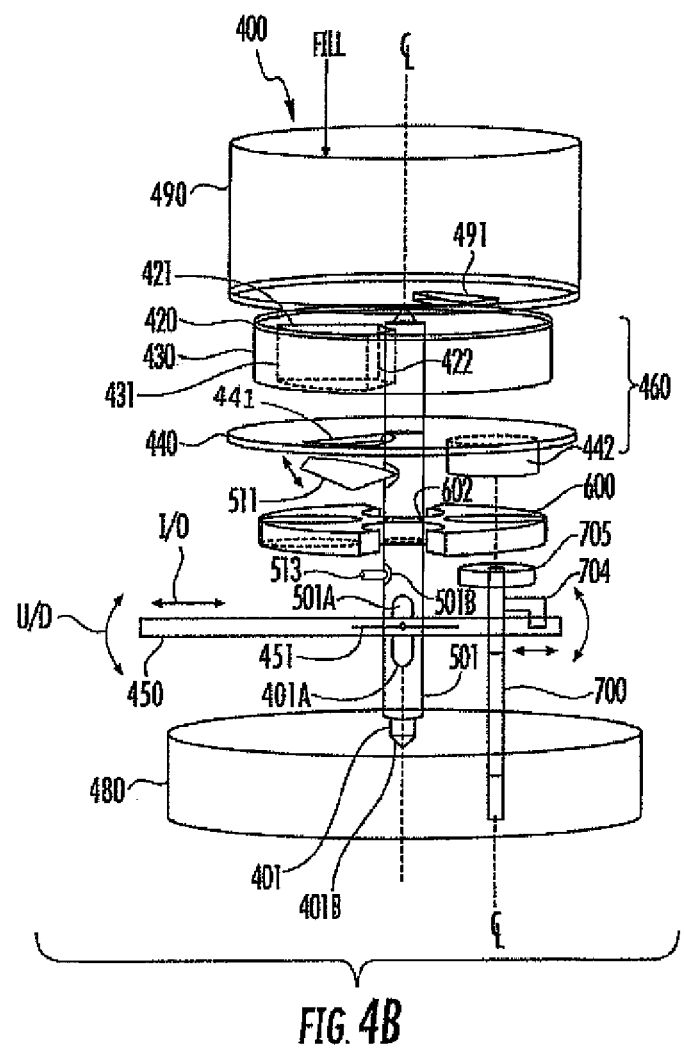
FIG. 4B is a partial exploded view of selected internal components of the proposed invention in a further assembled, but still partial exploded, array. As section along cup carrier 600 is shown at FIG. 4A-4A noting the supporting contour of cup supporting members 602 engaging cup or cartridge 301.
Figure 6A:
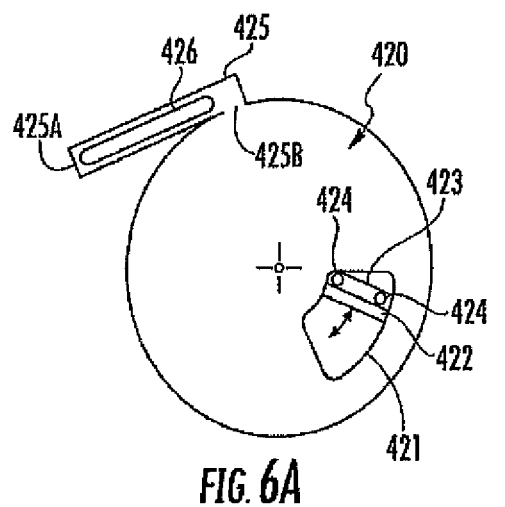
FIG. 6A is a top view of a top plate member with the adjustment arm extended before being bent (with force) to a final form.
Figure 6C:
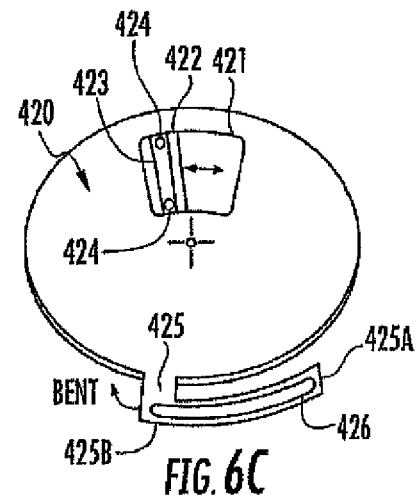
FIG. 6C is a perspective view of the top plate member of FIG. 6A, now with the adjustment arm bent perpendicular (see arrow) to the main plate surface.
Figure 6B:
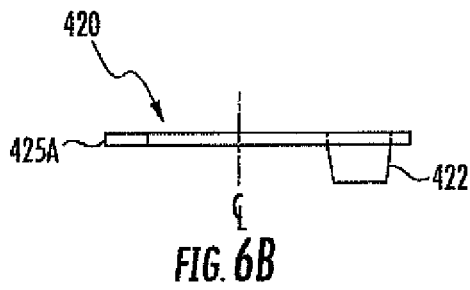
FIG. 6B is a side view of FIG. 6A noting the limit plate extension.
Figure 6D:
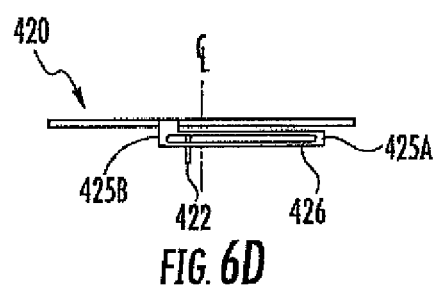
FIG. 6D is a side view of FIG. 6C with the adjustment arm bent downwardly and with the limit plate extension shown.
Figure 7A:
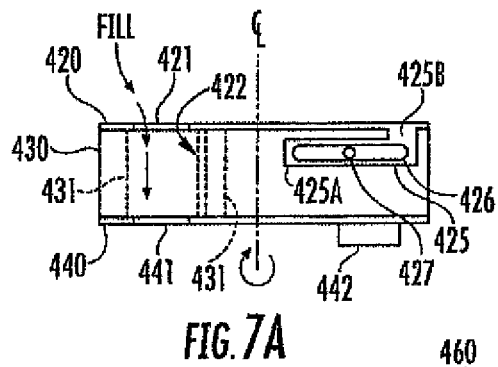
FIG. 7A is a side view of the assembly combination of the top plate, the fill plate, and the bottom plate in combination about the axis.
Figure 7B:
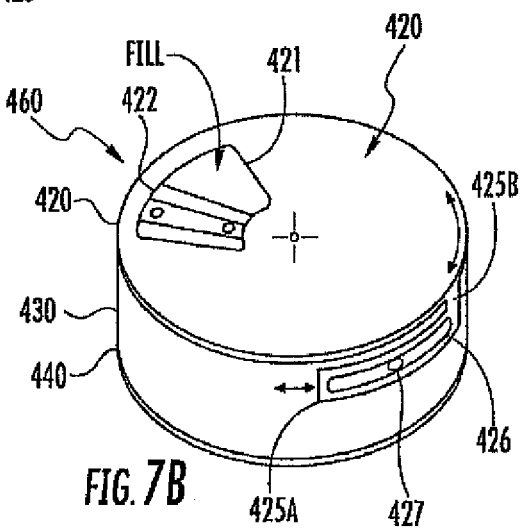
FIG. 7B is a perspective view of the assembly combination in FIG. 7A.
Figure 8B:
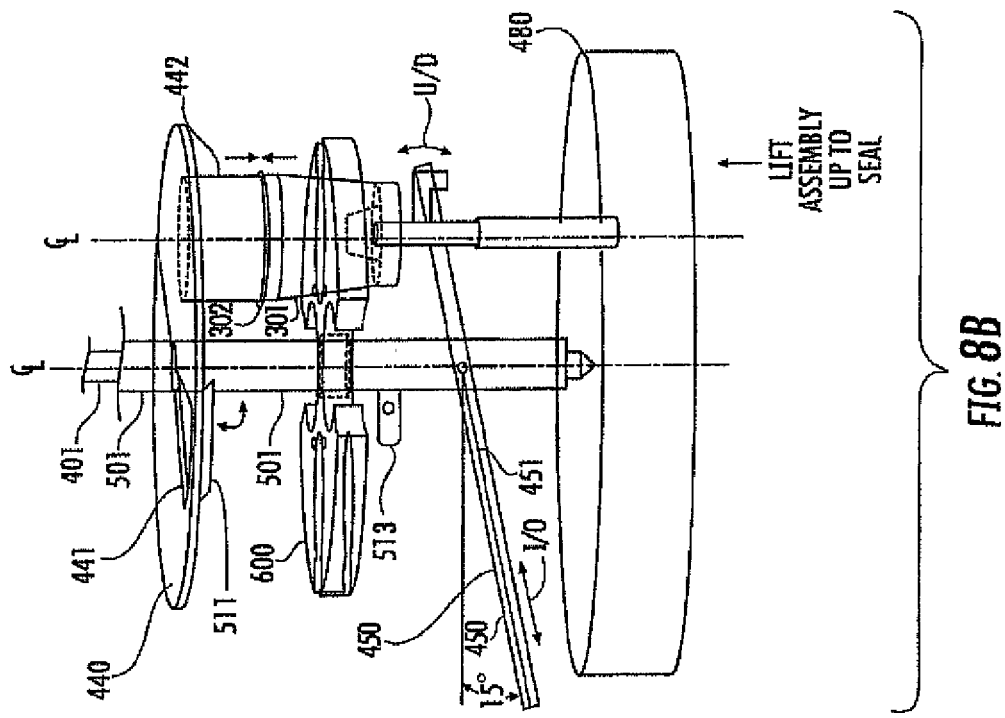
FIG. 8B is a partial assembly exploded view, as in FIG. 8A, with the lever arm listing the lift assembly to press the lid seal to the cup top rim.
Figure 8A:
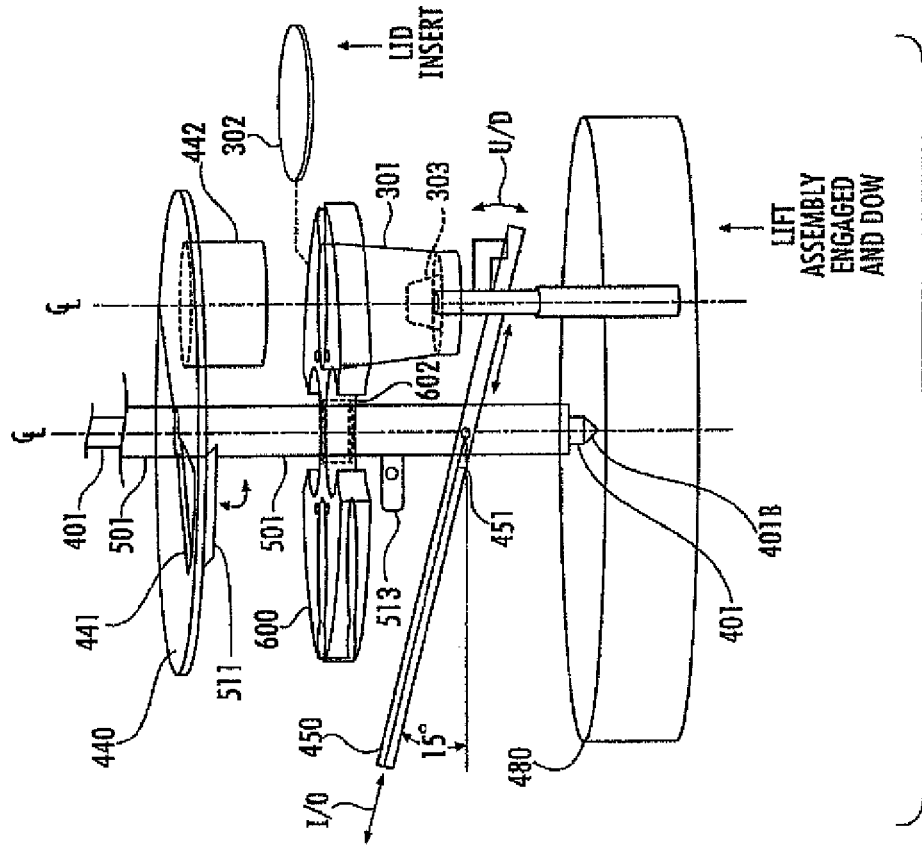
FIG. 8A is a partial assembly exploded view of the mechanism illustrating engagement of a lift-assembly by a sliding engagement of the lever arm for cup sealing.

Top plate assembly 420 with opening 421, further includes an adjustable dam 422 that extends perpendicular to the main plate of top plate assembly 420 (see FIG. 4A, FIG. 6B, 6D). Dam 422 is adjustable through the use of a slotted tab 423 and screws 424 allowing a user to adjust the amount of opening 421 in top plate assembly 420 exposed to opening 491 in holder 490, and also the alignment of the projecting dam 422.

Fill plate assembly is provided as a shortened cylinder fixed rotatably to first central axis 401 (and so rotates with left-right movement of lever arm 450) and includes a volume cavity 431 in the form of a pass-through during cartridge filling. It will be understood that as top plate assembly 420 is on top of fill plate assembly 430, so also does dam 420 slide into volume cavity 431. In this way, and via adjustment of dam 422 by taps 423 and screws 424 and opening/closing top plate opening 421, so that there is an adjustment of the available relative volume of fill plate assembly 430.

Projecting (radially when initially formed (FIGS. 6A, 10A, 10B), and later perpendicularly when bent (FIGS. 6C, 6D)) from top plate assembly 420 is an adjustment arm 425 formed as an elongate member having an end 425A with a connecting bridge 425B (See FIG. 6A). An elongate slot 426 is formed along adjustment arm 425 to engage a fixing screw 427 that can extend from the rear side of fill plate assembly 430 generally opposite to opening 441. In this way, screw 427 fixes top plate assembly 420 to fill plate assembly 430 and also allows the relative rotational adjustment (rotationally) of top plate assembly 420 to fill plate assembly 430. This allows a user or manufacturer to additionally rotationally adjust the radial position of dam 422 within opening 431 so as to open or reduce the available fill volume. In this manner it will be understood that the volume of fill may be adjusted, and also that the relative radial locations of openings 421, 431, 441 may be adjusted to conveniently fill a cup or cartridge 301.

It will be further understood that fill cavity assembly 460, having bottom plate assembly 440, with opening 441, rotationally joins and is rotationally related to fill plate assembly 430 and top late assembly 420. As a result, when lever 450 moves, first axis 401 moves, and so does fill cavity assembly 460. Thus, when fill plate assembly 430 and top plate assembly 420 return to a dispensing position (Columns 7-9 in FIG. 10B), they rotate relative to opening 441 in bottom plate 440, and align the fill cavity 431 of fill plate assembly 430, then if there is a trap-door-trigger trap door 511 moves relative to bottom plate opening 441, and a dispensement action occurs.

Similarly, as trap door 511 of trap door assembly 510 snuggly rides and slidingly seals the bottom of opening 441, but trap door assembly 510 operates on the second concentric column 501, until a cup 301 in cup carrier 600 interferes with and displaces trap door dog 513, opening 431 remains sealed and there is no dispensment.

Figure 5A:
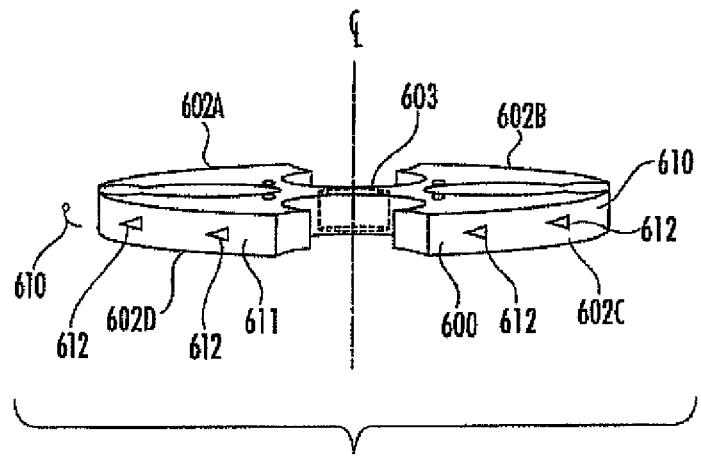
FIG. 5A is a perspective side view of a cup carrier of the present invention.
Figure 5B:
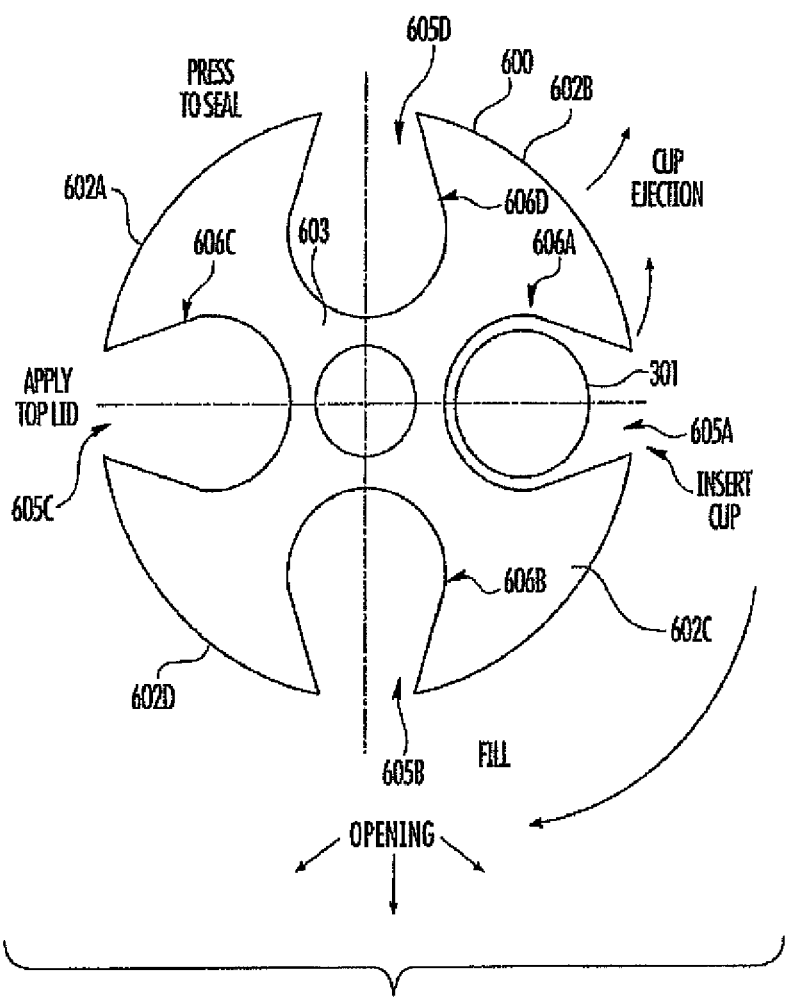
FIG. 5B is an illustrated side view of a cup carrier with an exemplary cup cartridge in an insert position.

As noted in cup carrier 600, there are four cup supporting members 602A, B, C, and D, each with opposed arms 604, forming respective cup supporting channels 605A, B, C, D (See FIGS. 5A, 5B, and FIG. 4A). The edges of respective channels 605A, B, C, and D, are formed with a supporting profile 606A, B, C, and D, that are shaped complementary to the outer profile of cup 301 and cup lip 301A (See FIGS. 3A-C, and FIG. 4A (exploded view). In this complementary arrangement, it will be understood that cup carrier 600 and respective supporting channels 605A-D support and securely suspend respective cups 301 in a secure manner, preventing unintentional dislodgement. It will additionally be understood that the supporting profiles 606A-D, or respective cup carriers 600, may be provided in a kit or interchangeable form so as to adaptively support and transport diverse cartridges or cups 301, and secure the same for a lid 302 during a pressing process, to be discussed.

As one alternative embodiment of a lid sealing assembly using adhesive or press-fit lids, suspending from a bottom surface of bottom pressing plate assembly 440 is a lid press member 442, formed with an outer shape sufficient to provide a pressing urging force to lip 301A of cup 301 during sealing. In this manner, if a user provides a press-fit-lid 302 or a version of a lid 302 having an adhesive ring, then during a sealing urging step (discussed below) pressure from lid press 442 is applied (discussed below).

Extending from support base 480 is a fully-independent telescopically, spring urged, cup-lifting assembly or cup sealing assembly 700 (see FIGS. 4A, 4B, and 8A, 8B). A hollow plunger tube 701 extends from support base 480 generally radially distant from the three collinear axes 401, 501, 601 and close to, but not engaging a tip end 452 of lever arm 450 in a retracted condition. A plunger 702 is a sliding member and is slidably riding within plunger tube 701, and in a preferred embodiment is springingly secured to the same via a spring 703 so as to be urged into a retracted position between uses (in a non-cup-interfering position).

Extending from a top of plunger 702 is a plunger plate 705 shaped to support a bottom of cup 301 during a lifting-sealing engagement. Optionally extending from plunger plate 705 is a geometry profile 706 that is complementary to the optional recess geometry 303 in the base of cup 301. While not required, and while the inter-fit of geometry profile/recess is helpful for secure sealing, it will be understood, that a variety of different geometry profiles 706 may be provided in a kit form to adapt to differently shaped cups or cartridges 300 and differently shaped recess geometries 303. It will be understood, that plunger plate 705 is positioned in a spring-neutral position below a bottom level of any suspended cups 301 in cup carrier 600 so that cup carrier 600 and cups 301 may pivot without interference therefrom except during a sealing activity (to be discussed). Extending radially away from plunger 72 is a fixed extending plunger hook 704 shaped to have an interfering engagement with top end 452 of lever arm 450 during the sealing.

During a sealing use, a filled cup is in an 'apply top lid' position as shown in FIG. 5B, and a lid is manually applied (but not sealed) to the top thereof, for example via a portal 206A in housing 200. During a further rotation of lever arm 450, cup carrier 600 rotates, preferably in a direction shown by the arrow in FIG. 5B, and the cup 301+lid 302 (loose) is rotated to the 'press to seal' position as shown in FIG. 5B, so that lid press member 442 of bottom plate assembly 40 is directly over lid 302 and cup 201. In this position lever arm 450 is lifted relative to pin 401A (placing top end 452 downwardly) and is urged inwardly to opening 203 thereby alligning pin 401A to ride along slot 451 in lever arm 450 and extend tip end 452 thereof under and engage plunger hook 704. At this point, the opposite end from tip end 452 is depressed, thereby lifting plunger hook 704, and in turn raising plate 705 and engaging the bottom of cup 301B and urging cup 301 upwardly, to make a pressure contact between cup 301, lid 302 and lid press assembly 442 (or lid press member 442). After sufficient pressure is applied the lid is sealed to cup 301 and ready for ejection during a next move by interference with ejection mechanism 207 and outwardly 'cup ejection' as noted in FIG. 5B.

Figure 9A:
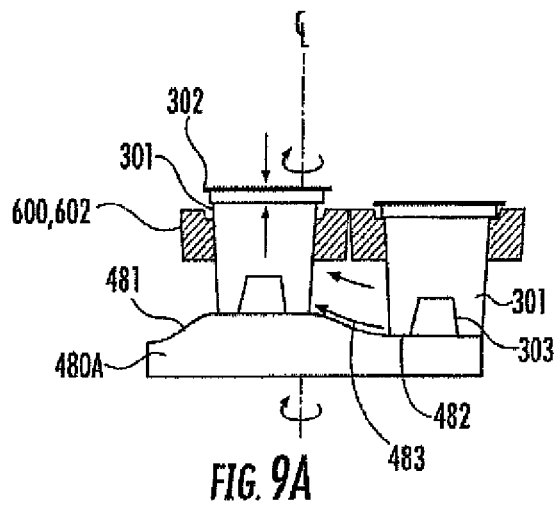
FIG. 9A is an alternative cup handing and sealing arrangement having a guiding contour form on a bottom support element elevated relative to a cup carrier.
Figure 9B:
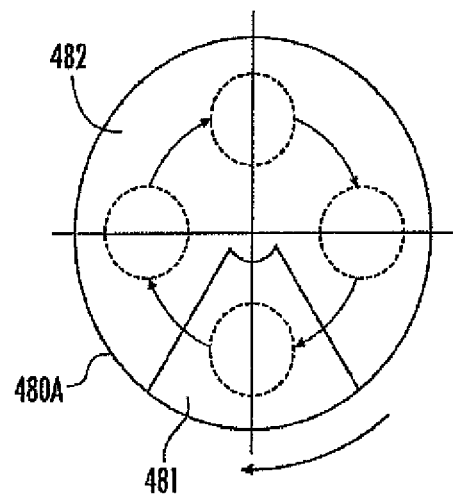
FIG. 9B is a top view of the radially arranged guiding contour on the bottom support.
Figure 9C:
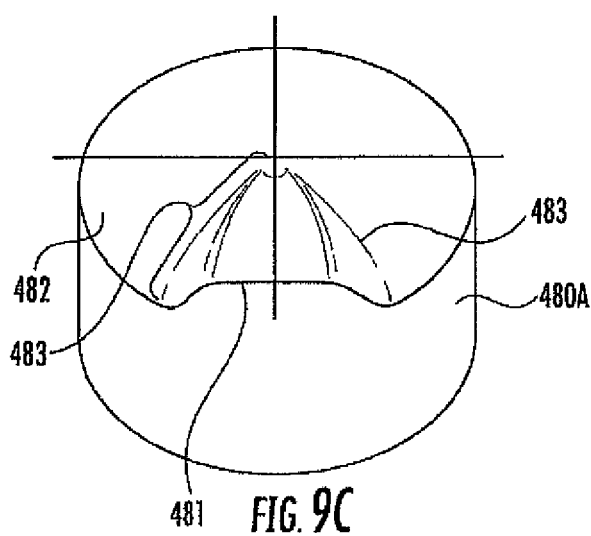
FIG. 9C is a perspective view of the bottom support element in FIGS. 9A and 9B noting the radially arranged guiding contour to lift the cup relative to cup carrier and into a lid sealing contact.

Alternatively referring now to FIGS. 9A, 9B, and 9C, in an alternative arrangement a support base 480A does rotate about a central axis (e.g., support base 480A in this embodiment is not fixed in place relative to the various axes), and is driven in a single directly by a catch-and-spring-prawl arrangement below support base 480A for respective movements of lever arm 450 (back-forth-back-forth). Support base also includes a radial profile wedge shape portion 481 that is thicker (or higher) than the other radial locations having a common level 482 in support base 480A. There is a smooth and slidingly blended transition 483 from the lower common level 482 to the upper level 481. As shown, in this alternative embodiment, cup carrier 600, having cup supporting members 602 (only the ends are shown in sectional view, as along the section cut line in FIG. 4A, and Section view FIGS. 4A-A. As will be understood by those of skill in the art, in this alternative embodiment, during the motion of lever arm 450 (and continuous rotation of rotating support base 480A, cup carrier 600 freely swings, and when raised profile portion 481 is rotated to a cup bottom 301B, cup 301 is raised relative to the prior level at 482, and as a result, a lid 302 placed thereon may be pressed upon by a lid press (noted but not shown herein). As a result, alternative arrangements of the present mechanisms and systems may be provided without departing from the scope and spirit of the present invention and this should be recognized by those of skill in this art.

Figure 10A:
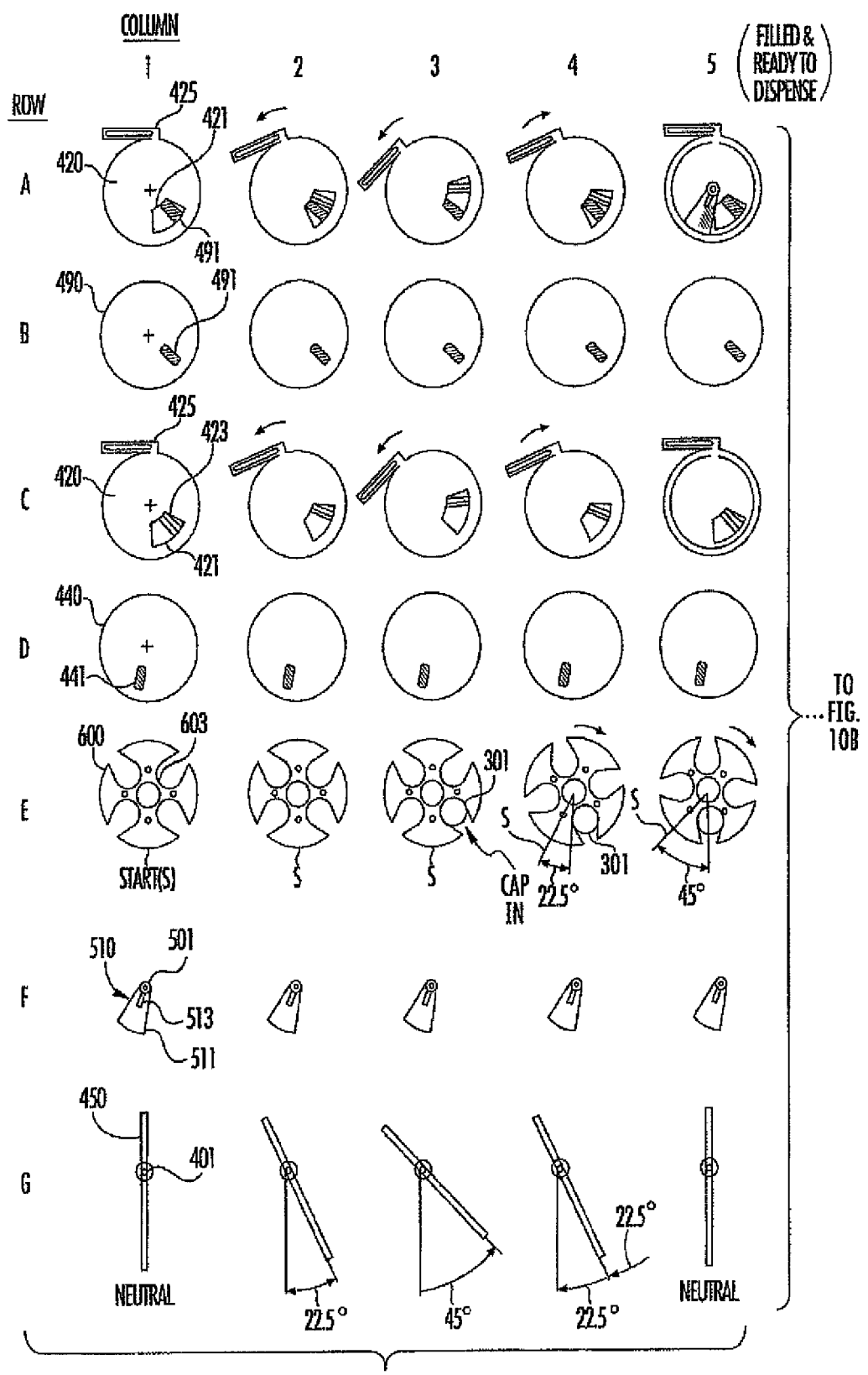
FIG. 10A is an exemplary schematic layout of selected elements and positions in axial alignment in the proposed invention performing a cavity-filling process at specified steps and positions.
Figure 10B:
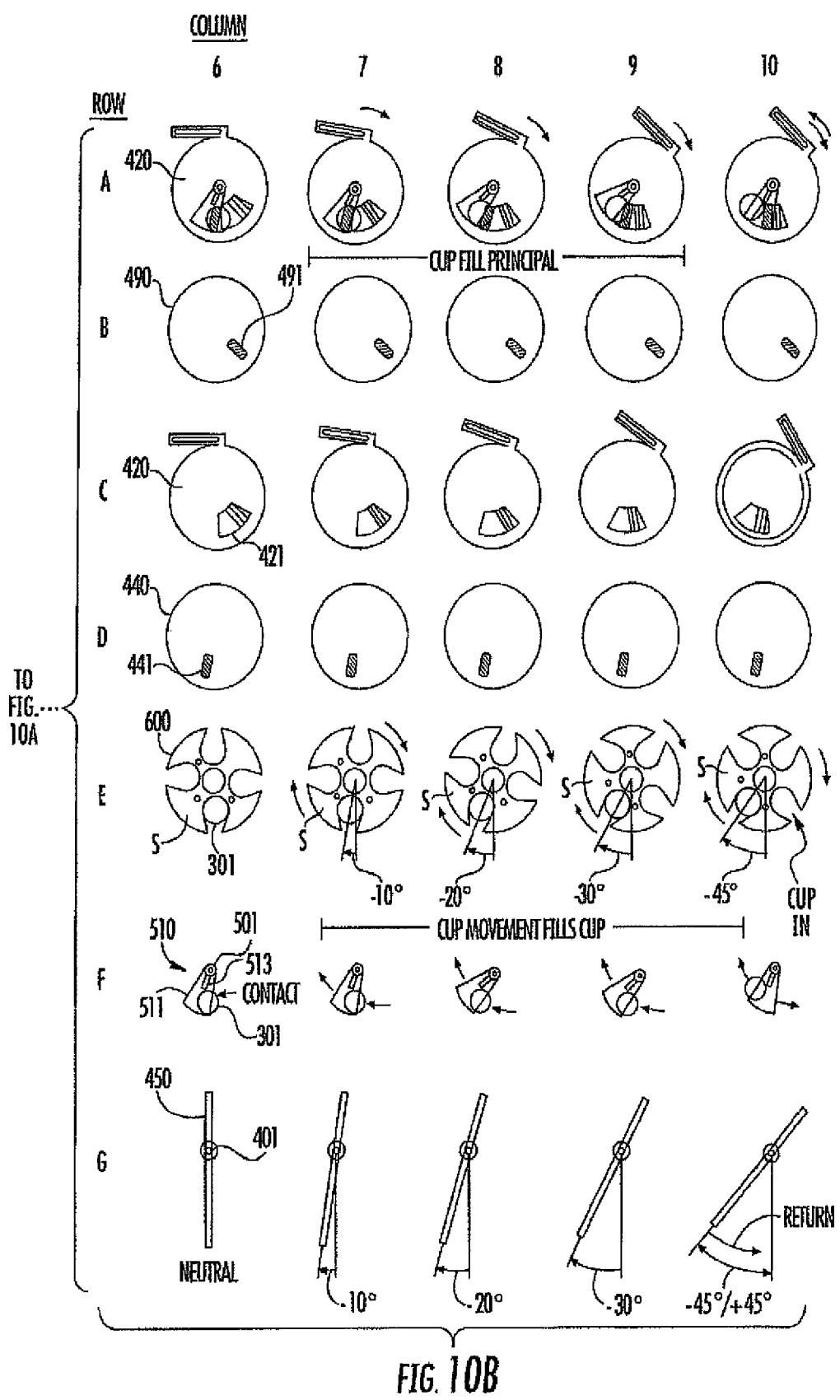

Now additionally referring to FIGS. 10A and 10B the inventive process is discussed in two different operations, (i) filling of fill cavity volume 431 from the holder or reservoir 490, generally noted columns 1-5, and (ii) filling cup 301 with a dispensement from cavity volume 431, generally noted in columns 3-10.

As will be understood by those if skill in the art having studied FIGS. 10A and 10B, that selected elements in the assembly are provided at individual rows B-G, and that row A is a composite exemplary alignment view of the functions and alignment of elements in Rows B-F. As a result, for example, Column 1, Row A, notes the position of opening 491 (but not holder 490), relative to the position of top fill plate 420 and opening 421 in top plate 420 relative to opening 441 in bottom plate 440 and the position of cup carrier 600 with a cup 301 and the position of the trap door assembly 510 with trap door 511 for beverage dispensment.

Row A is a composite view (as noted above). Row B is the reservoir 490 with fixed position of opening 491. Row C is the top plate 420 position which rotates with the lever arm position. Row D is the bottom plate 440 having a fixed bottom plate opening location 441. Row E is the cup carrier position relative to motion for filling and dispensing. Row F is the trap door assembly 510 position relative to being triggered by a cup. Column 1 notes a neutral or center position of lever arm 450.

Generally, in reviewing FIGS. 10A, 10B, in considering the centermost column 401, the right movement of lever 450 to the stops fills cavity 431, then IF a cup 302 is present, the leftward movement of lever 450 from the right to the center (neutral) functions to trigger trap door 511 and deposits the beverage from fill cavity 431 into cup 301. In a separate step, when lever 450 is aligned, guides allow vertical lever movement to seal cup 301 in the opposite rear position (depending upon the rotation—it be understood that any of the actions may occur in other rotational arrangements without departing from the scope and spirit of the present invention. The down stroke of lever 450 also pushes down the spring loaded hinged dog 513 that activates trap door 511 and provides clearance to move past the existing cup and return trap door 511 to the closed position now that fill cavity 431 is empty.

Regarding the second central concentric column 501, when a cup 301 is present, the dog 513 contacts cup 301 and rotates as the cup is indexed rotationally. This movement shifts trap door 511 in bottom plate 440 allowing beverage component (powder, granular) to fall through hole 441 into cup 301. The cup carrier 600, filler cavity 431, and trap door 511 move together exposing the full base of the fill cavity 431 to cup 301 allowing all product to fall into cup 301. In the left most position now, the downward movement of lever 450 allows hinged dog 513 to clear the cup and the spring loaded trap door assembly 510 resets and closes in position, closing cavity volume 431 for the next index operation. If a cup 301 is not present, dog 513 is not activated, and trap door 511 remains closed, preventing spilling.

Regarding the third central concentric column 601, as lever 450 moves rightwardly, the cup carrier 600 remains in position as the back of a hook 610 fixed external to cup carrier 600, and retains the same, and rides on the circumferential surface 611 of cup carrier 600, having a series of one-directional grooves 612 shaped to engage hook 610 to allow rotation of cup carrier 600 in a single direction (e.g., there is a ratchet-or-prawl arrangement to allow single-direction-rotation).

As noted in FIGS. 10A-10B, each column typifies a significant position of the lever 450 in a cup fill process. While the top plate assembly 420 typically moves from the leftmost to the right most position, the cavity 431 fill and cup 301 insert (Col. 3, Row E) operations are mutually exclusive and occur as lever 450 moves from the center (neutral position) to the right most (FIG. 10A) and then to center (neutral) and then to the left most (FIG. 10B) position respectively before returning to a center (neutral position). The beverage volume 490 and hole 491 (Row B) with bottom fill plate 440 and opening 441 (Row D) do not move as they are part of the fillers structures.

The lever 450 position (Row G) is fixed to the fill cavity assembly 460 and the components move radially together. For simplicity the cup-fill step is shown in a maximum volume configuration (e.g., dam 422 is moved openly to maximize a volume of fill cavity 431), however it will be understood by those of skill in the art that an infinite degree of 'fill volume' may be dictated by the present invention via adjustment of the fill volume itself. For lesser fill volumes, the top plate assembly 420, and related adjustment arm 425 and slot 426 and dam 422 are adjusted.

The cup carrier 600 (Row E) and trap door assembly 510 (Row F) move independently from each other and their specific movements are described herein, and below, as needed.

The movement from the center position of lever 450 to the right, fills cavity volume 430, and for simplicity the operation of filling the cavity 431 from the center to the right most position, and return to the center (of lever 450) will only show the fill operations on the composite row (Row A, Cols. 1-5) the cup-fill and deposit procedure (Cols. 3-10, and principally Cols. 7-9 as cup movement is shown). As a result, the simultaneous fill operations will not be shown in the composite Row A in Cols. 6-10.

As will be discussed below, there are cavity fill process steps, and cup filling process steps.

Process Steps for filling dispensing cavity 431 with material includes: In Col. 1, the reservoir enclosure hole 491 is over the top plate 420 and dam 422 of fill cavity 431 and no material can enter cavity 431. In Col. 2, with rotation 22.5 of lever 450 degrees to the right, the open cavity 431 space is directly under the volume hole 491, and the size of the hole 421 will allow the material to fall freely through hole 421 into cavity 431. In Col. 3, with lever 450 rotated an additional 22.5 degrees (total of 45 degrees to the left) the left edge of open cavity space 431 is directly under the dispensement hole 491 and this position assures the full cavity 431 is exposed directly to the fill hole 491. In Col. 4, the lever 450 returns 22.5 degrees to the left, and cavity 431 makes a second pass under fill hole 491 assuring there is a full-capacity fill. In Col. 5, the lever is returned to the neutral position and the enclosure hole 491 over plate 420 and dam 422 covers the enclosure hole 491 with the fill cavity assembly 460 (top plate assembly 420 and fill plate assembly 430), stopping the cavity fill process. In FIG. 10A, the bottom plate 440 hole 441 and trap door assembly 510 has been shown to confirm the independence of the cavity 431 fill process and cup 300 fill process operations.

In the cup 300 fill process, in Col. 3 when the lever is at a 45 degree rightmost position, a cup 300 is inserted into cup carrier 600, and similarly a filled cup (not shown) is in the left-most-position and a lid 302 may be placed on the cup 301. As discussed elsewhere in FIG. 5A, a barbed hook 610 with a spring (not shown) engages a series of one-directional stop grooves 612 so that cup carrier 600 rotates in a continuous direction. In Col. 4., with lever 450 returning 22.5 degrees to the left and Row E/Col. 4 shows movement of cup carrier 600 and cup 301 as the lever 450 rotates, and in Row F/Col. 5, the lever is returned to center/neutral, and the cup 301 is rotated and engages dog 513. IN Row F, col. 6, the cup 301 contracts trap door dog 513 and any movement beyond this center position will force dog 513 and trap 511 to rotate and uncover cavity opening 441, allowing the material to fall into cup 301. In Col. 7, lever 450 is moved 10 degrees left of the center position, and in Col. 7/Row A, the dog 513, triggers the uncovering of cavity 431 and initial dispensing through opining 441. In Col. 8, lever 450 is moved 30 degrees leftwardly and in Row A/Col. 8 the uncovering of the fill hole 431 continues fully. In Co. 9, lever 450 is moved 30 degrees leftwardly and Row. A/Col. 9, dog 513 engages cup 301 fully continuing to fill cup 301 (presuming cavity 431 is full). In Col. 10 lever 450 is moved fully 45 degrees leftwardly, and the trap door dog 513 is passed engagement, and will be pressed down allowing it to pass the wall side of cup 301, and so trap door 511 swings back to cover opening 441, and dog 513 also springs back to position to contact readiness for the next cup 301 on cup carrier 600. Thereafter, an inward, or downward motion of lever 450 engages cup sealing system and plunger hook 704 to lift cup 301, with a lid 302 loosely placed, into a sealing contact with the cup 301, and the initial next-movement (Col. 2) urges cup 301 to ejection mechanism 207 and outwardly for ejection.

It will be understood by those of skill in the art that the elements and features as discussed herein may be adaptively described as being in a cartridge or cup handling system or cartridge or cup filling system or in a cartridge or cup housing member without limitation thereto. Therefore, as a non-limiting example, a cartridge handling cup supporter may also be understood to be a cartridge filling cup supporter, in that the cup supporter functions and operates as discussed herein without limit to how grouping of purpose is described.

It will be additionally understood by those of skill in the art that the relative motions and lever-engagements as discussed herein are non-limiting and may be adapted within the scope and spirit of the present invention. As a non-limiting example, the motion of the lever (left-right, or in-out) may be performed in an angular manner (e.g., left-right-left, inward, etc.) or may be performed in a different flow (e.g., left, right, down, left, up, right etc.) if the elements and functions herein are arranged differently. As a result, it will be understood that the present invention includes all such adaptive modifications within the scope and spirit of the present disclosure without need for a specific diagram or drawing.

It will also be understood by those of skill in the art that the proposed system further enables a kit containing the system and system components and a method for operating the beverage cartridge preparation device so as to result in a sealed beverage cartridge ready for storage, transport, or other use in a convenient manner.

It will be understood by those of skill in the art having studied this disclosure that the phrases beverage fillers, brewing components, contents, coffee, tea, flavored fillers, brewing materials, etc. will be recognized as the portions retained within the bounding cartridge, and without limitation thereon and such descriptions may be used interchangeably without departing from the scope and spirit of the present invention. For example, a user may wish to blend coffee and hot chocolate components in a single user-determined component to suit a particular preference. Alternatively, while the use of a thermal brewing cycle is preferred, noting herein is so limiting; and it will be understood that cold brewing cycles are also enabled by this device. For example, a cold-tea and a cold-lemonade cartridge may be prepared as well without departing from the scope and spirit of the present invention.

It will be further understood by those of skill in the art that the proposed system may be further expanded to contain a feeding or supply apparatus for continuously supplying a stack of empty beverage cartridge for filling to a location proximate to the mobile support for speedy filling of the same.

Having described at least one of the preferred embodiments of the present invention with reference to the accompanying drawings, it will be apparent to those skills that the invention is not limited to those precise embodiments, and that various modifications and variations can be made in the presently disclosed system without departing from the scope or spirit of the invention. Thus, it is intended that the present disclosure cover modifications and variations of this disclosure provided they come within the scope of the appended claims and their equivalents.

What is claimed is:

1. A system for preparing a beverage cartridge, comprising:
 a frame member provides a support base spaced from a top support portion;
 at least one sealable container on said top support portion configured to securely retain and dispense a brewing component during a use into said beverage cartridge;
 a cartridge handling system on said support base configured to rotationally position an empty said beverage cartridge in at least one of a filling position and a sealing position arrayed along said support base having a central pivot axis;
 a cartridge filling system positioned proximate said cartridge handling system and relative to said sealable container configured to dispense said brewing component into said beverage cartridge during a filling use;
 said cartridge handling system further comprising:
  at least one movement guide apparatus for moving a portion of said cartridge handling system relative to said sealable container supported rotationally about said central pivot axis and returning to said filling position with a selected volume of said brewing component;
  a filling apparatus for guiding said selected volume of said brewing component from said cartridge handling system into an interior of said beverage cartridge while said beverage cartridge is in said filling position;
  a motion apparatus containing a mechanism operative to drive said movement guide apparatus of said cartridge handling system while said beverage cartridge with said brewing component is in said filling position during said filling use; and a sealing apparatus also operative relative to said motion apparatus, and operative to provide a sealing of said beverage cartridge while said beverage cartridge is in said sealing position.

2. The system for preparing a beverage cartridge, according to claim 1, further comprising:

a cover member for sealing said beverage cartridge following said step of filling;

said cover member being one of a foil cover, a friction sealing cover, a plastic cover, a paper cover, an adhesive cover, a crimping cover, and a combination of one or more of said covers; and said sealing apparatus further operative to seal said cover member to a top portion of said beverage cartridge using at least one of a friction sealing, a thermal sealing, a sonic sealing, an adhesive sealing, and combinations of more than one of these sealing steps.

* * * * *